(12) United States Patent  
Benedetti et al.

(10) Patent No.: US 8,544,236 B2
(45) Date of Patent: Oct. 1, 2013

(54) FASCIA BRACKET WITH QUARTER TURN LOCKING NUT

(75) Inventors: Steve M. Benedetti, Sterling Heights, MI (US); Patricia E. Patt, Harrison Township, MI (US)

(73) Assignee: Newfrey LLC, Newark, DE (US)

( * ) Notice: Subject to any disclaimer, the term of this patent is extended or adjusted under 35 U.S.C. 154(b) by 154 days.

(21) Appl. No.: 13/206,790

(22) Filed: Aug. 10, 2011

(65) Prior Publication Data

US 2013/0037668 A1   Feb. 14, 2013

(51) Int. Cl.
*E04C 2/38* (2006.01)

(52) U.S. Cl.
USPC ........................................... 52/716.6

(58) Field of Classification Search
USPC .......... 52/716.1, 716.5, 716.6, 716.8, 718.01, 52/718.04, 718.05, 718.02, 718.03, 717.03, 52/717.04–717.06
See application file for complete search history.

(56) References Cited

U.S. PATENT DOCUMENTS

| | | | | |
|---|---|---|---|---|
| 2,258,668 A * | 10/1941 | Zahodiakin | ................. | 411/554 |
| 2,605,871 A | 8/1952 | Kress at al. | | |
| 2,610,375 A * | 9/1952 | Churchill | ................. | 24/290 |
| 2,788,100 A * | 4/1957 | Landell | ................. | 52/716.6 |
| 3,120,686 A * | 2/1964 | Pickering | ................. | 24/291 |
| 3,123,389 A * | 3/1964 | Biesecker | ................. | 292/218 |
| 3,239,988 A | 3/1966 | Meyer | | |
| 3,246,440 A | 4/1966 | Meyer | | |
| 3,298,145 A * | 1/1967 | Minervini et al. | ................. | 52/127.9 |
| 3,411,262 A * | 11/1968 | Meyer | ................. | 52/718.04 |
| 3,664,073 A * | 5/1972 | Tucker | ................. | 52/127.7 |
| 3,764,729 A * | 10/1973 | Kowalewski | ................. | 174/138 D |
| 3,766,697 A * | 10/1973 | Jackson | ................. | 52/312 |
| 3,811,154 A * | 5/1974 | Lindeman et al. | ................. | 24/326 |
| 3,986,780 A * | 10/1976 | Nivet | ................. | 403/353 |
| 4,007,516 A * | 2/1977 | Coules | ................. | 411/349 |
| 4,213,230 A * | 7/1980 | Hoen | ................. | 24/580.1 |
| 4,422,222 A * | 12/1983 | Notoya | ................. | 24/614 |
| 4,674,247 A * | 6/1987 | Hayashi et al. | ................. | 52/208 |
| 4,810,147 A * | 3/1989 | Hirohata | ................. | 411/349 |
| 4,828,444 A | 5/1989 | Oshida | | |
| 5,142,834 A | 9/1992 | Laclave et al. | | |
| 5,291,639 A | 3/1994 | Baum et al. | | |
| 5,332,347 A * | 7/1994 | Kimisawa | ................. | 411/182 |
| 5,507,610 A * | 4/1996 | Benedetti et al. | ................. | 411/339 |
| 5,651,632 A * | 7/1997 | Gordon | ................. | 403/319 |
| 5,651,634 A * | 7/1997 | Kraus | ................. | 403/408.1 |
| 6,264,393 B1 * | 7/2001 | Kraus | ................. | 403/282 |
| 6,557,832 B2 * | 5/2003 | Shreiner | ................. | 256/65.15 |
| 6,575,682 B1 | 6/2003 | Dohm et al. | | |
| 6,612,795 B2 | 9/2003 | Kirchen | | |
| 6,684,568 B2 * | 2/2004 | Blume et al. | ................. | 49/349 |
| 6,984,096 B2 * | 1/2006 | Kraus | ................. | 411/48 |
| 7,752,720 B2 | 7/2010 | Smith | | |
| 7,891,151 B2 * | 2/2011 | Sano | ................. | 52/506.05 |
| 7,927,050 B2 * | 4/2011 | Koike | ................. | 411/104 |
| 8,403,356 B2 * | 3/2013 | Tago et al. | ................. | 280/728.2 |

* cited by examiner

*Primary Examiner* — Mark Wendell
*Assistant Examiner* — Keith Minter
(74) *Attorney, Agent, or Firm* — Harness, Dickey & Pierce, P.L.C.

(57) ABSTRACT

A system for coupling a trim component to a body component having two generally perpendicular surfaces. A rotatable fastener is coupled to the trim component. The rotatable fastener has a plurality of force transmitting surfaces.

16 Claims, 12 Drawing Sheets

FASCIA BRACKET WITH QUARTER TURN LOCKING NUT

FIELD

The present disclosure relates to a system and method for coupling a trim component to a sheet metal structure and, more particularly, to a caged nut system configured to couple a plastic trim component to a fastener welded to a sheet metal structure.

BACKGROUND

This section provides background information related to the present disclosure which is not necessarily prior art.

Vehicle bodies are complex assemblies that typically include inner and outer panels coupled to a sheet metal body. Polymer panels, therefore, must be structurally able to securely attach to the sheet metal interior and exterior structures while presenting to the customer an aesthetically pleasing surface. Traditionally, an even gap between components is aesthetically desirable.

SUMMARY

This section provides a general summary of the disclosure, and is not a comprehensive disclosure of its full scope or all of its features.

A system for coupling a trim piece to a sheet metal component is provided. The system includes a T-shaped fastener welded to the sheet metal component. The trim component has first and second bearing surfaces configured to bear against first and second sheet metal bearing surfaces. A rotatable fastener having a generally cylindrical body is provided which defines a cylindrical fastener capturing aperture therein. The cylindrical body defines a side slot configured to accept the T-shaped weld fastener coupled to the first sheet metal bearing surface. The cylindrical interior cavity has a first portion having a first diameter, and a second portion having a second diameter larger than a diameter of the T-shaped weld fastener. The rotatable fastener is rotatable from a first position to a second position to capture the fastener.

According to other teachings, a system for coupling a trim component to a body component having two generally perpendicular bearing surfaces. The system has a T-shaped fastener coupled to the body. The trim piece has first and second exterior bearing surfaces and an interior bearing surface. Defined within the trim piece is a keyway having a lead-in portion. A rotatable fastener having a nut body with a cylindrical body portion is rotatably positioned within the keyway. The body defines a fastener holding aperture and defines a side slot. Additionally, the fastener has an exterior carrying flange configured to bear against the interior bearing surface upon rotation of the nut.

According to another embodiment, a system for coupling a trim component to a sheet metal component is disclosed. The system includes a T-shaped fastener coupled to the sheet metal. The trim piece has first and second sheet metal bearing surfaces, and an interior surface opposite the first surface, the trim piece defines keyway having a circular bearing section. A nut is disposed within the keyway. The nut has first and second flanges disposed on either sides of the keyway. The second flange defines a ramped surface configured to apply forces onto the trim piece when the nut is rotated about the T-shaped fastener.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 2A-5C represent coupling of the trim component to the sheet metal component;

Corresponding reference numerals indicate corresponding parts throughout the several views of the drawings.

DETAILED DESCRIPTION

Example embodiments will now be described more fully with reference to the accompanying drawings.

Figure 1:
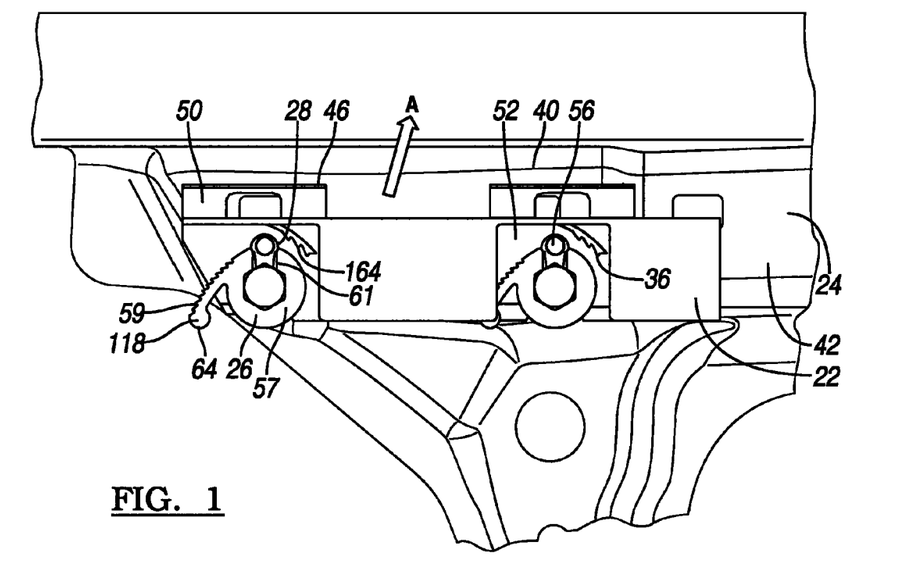
FIG. 1 represents a trim component coupled to a vehicle sheet metal structure according to present teachings.

FIG. 1 represents a front view of the coupling mechanism 20 for coupling a trim component 22 to a sheet metal structure 24 in its engaged position. It is envisioned the trim component 22 would have an aesthetically pleasing exterior surface (not shown) which is being coupled to the sheet metal structure. The coupling mechanism 20 has a rotatable fastener 26 disposed within a keyway 28 defined within a trim component coupling area 30. The trim coupling area 30 has a first bearing member 32 configured to bear against a first bearing surface 34 on the sheet metal structure 24. The rotatable fastener 26 can have a plurality of camming or force producing surfaces which will cause the trim component to be correctly positioned with respect to the sheet metal structure 24. The trim component 22 can have a locking finger 36 which is configured to selectively engage the locking protrusion 38 disposed on the rotatable fastener 26.

FIGS. 2A-5C represent the coupling of the trim component 22 to the sheet metal structure 24. The sheet metal structure 24 has a pair of surfaces 40 and 42 which act as bearing and alignment surfaces for the trim component 22. These surfaces 40, 42 can be perpendicular to each other, or can be set at a fixed angle. The trim component 22 has a similar pair of complimentary surfaces 46 and 48 which are configured to engage the surfaces 40 and 42 of the sheet metal component. One of the coupling surfaces 40 can be formed on a semi-rigid member 50 which can elastically deform a small amount when subjected to an engagement force. The trim component 22 can have an interior surface 52 or a planar member obverse the surface 48.

Figure 2A:
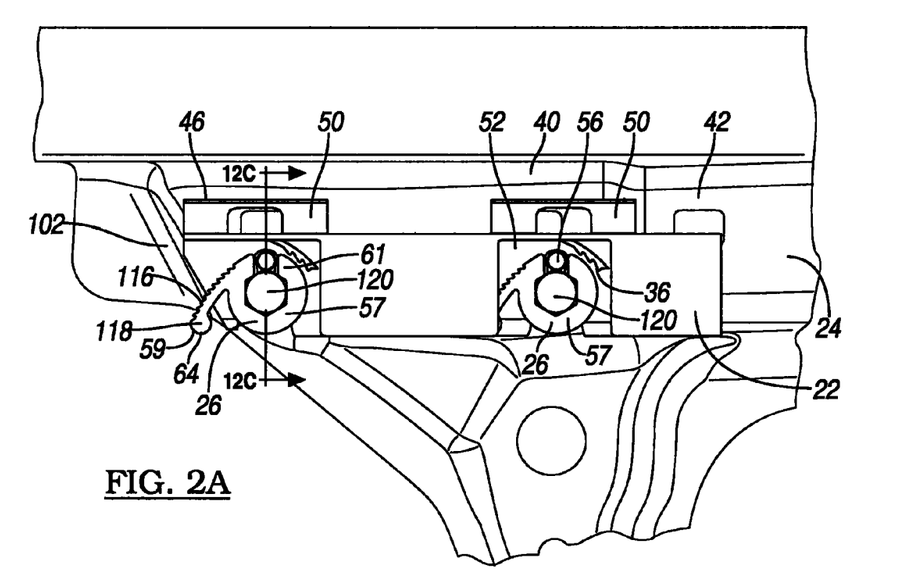

As shown in FIG. 2A, defined on the member obverse surface 48, the trim component 22 defines a keyway 28 configured to be positioned over the T-shaped stud 56 which is welded to the sheet metal structure 24. As further described below, the trim component 22 is translatable in a first direction "A" generally perpendicular to a slot 61 defined within the rotatable fastener 26. Optionally, the locking finger 36 engages a camming arm 64 disposed on the rotatable fastener 26.

The T-shaped stud 56 is positioned through an aperture defined by the keyway 28. As shown, the trim component 22 can have a pair of coupling mechanisms 20 to couple the trim component 22 to the sheet metal structure 24. The trim component 22 is translated with respect to the sheet metal structure 24, sliding the T-shaped stud 56 within the keyway 28 and into the rotatable fastener 26.

Figure 2B:
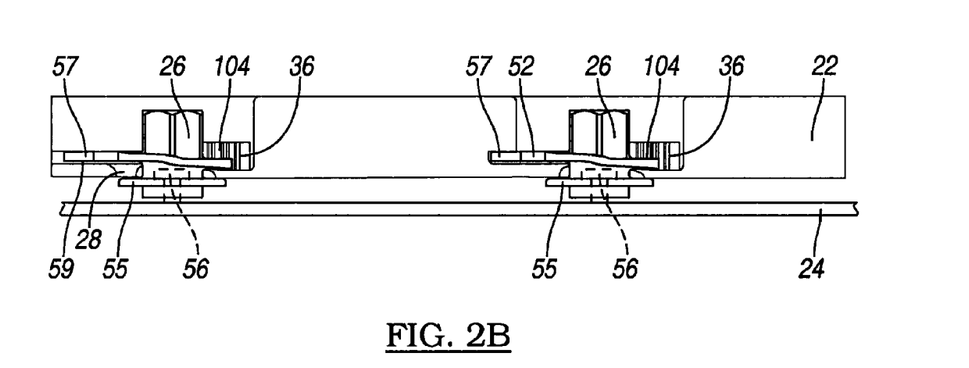

FIG. 2B represents a side view of the coupling of the trim component to the sheet metal structure 24. Shown is the alignment of the two studs with the pair of coupling mechanisms 20. As shown, the rotatable fastener 26 can have a pair of generally circular coupling flanges 56 and 57 which are configured to slidably and rotatably couple to the trim component 22. The first coupling flange 55 is generally planar, while the second flange 57 has a ramped surface 58. Protruding from the second coupling flange 57 is the camming flange surface 59. This camming flange surface 59 can be generally parallel to the first coupling flange 56 and generally perpendicular to the T-shaped stud 56 or parallel to the head 68 of T-shaped stud 56.

Figure 2C:
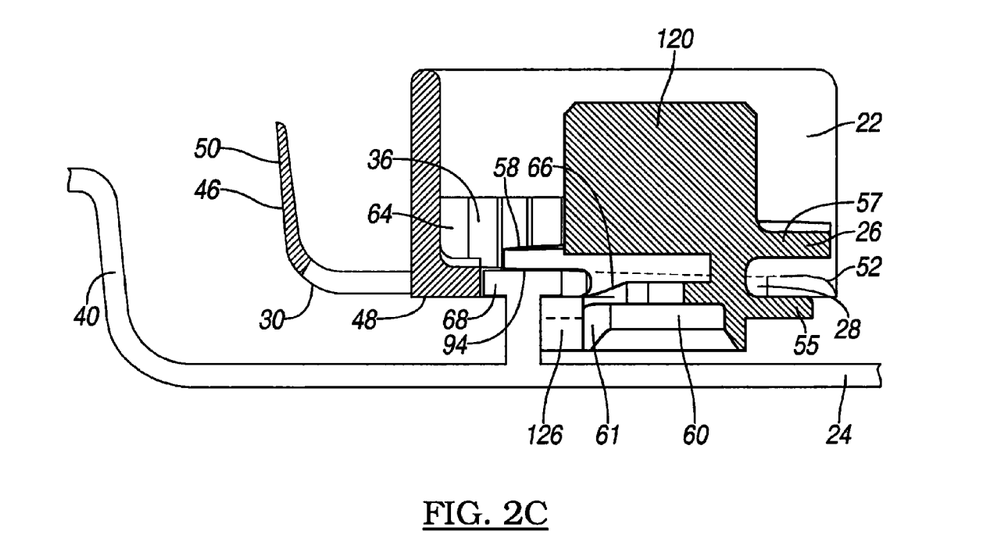

FIG. 2C represents a cross-sectional view of the rotatable fastener 26 disposed within the keyway 28. Shown is a generally cylindrical inner aperture 60 configured to accept the T-shaped stud 56. The aperture 60 has a first portion 62 having a first diameter and a second portion 64 having a second diameter larger than the first diameter. Also shown is a ramped surface 66 which assists in guiding the head portion 68 of the T-shaped stud 56 into the second position 64 of the aperture 68. Fluidly coupled to the aperture 60 is the side slot 61 configured to allow access by the T-shaped stud 56 to the cylindrical inner aperture 60.

Figure 3A:
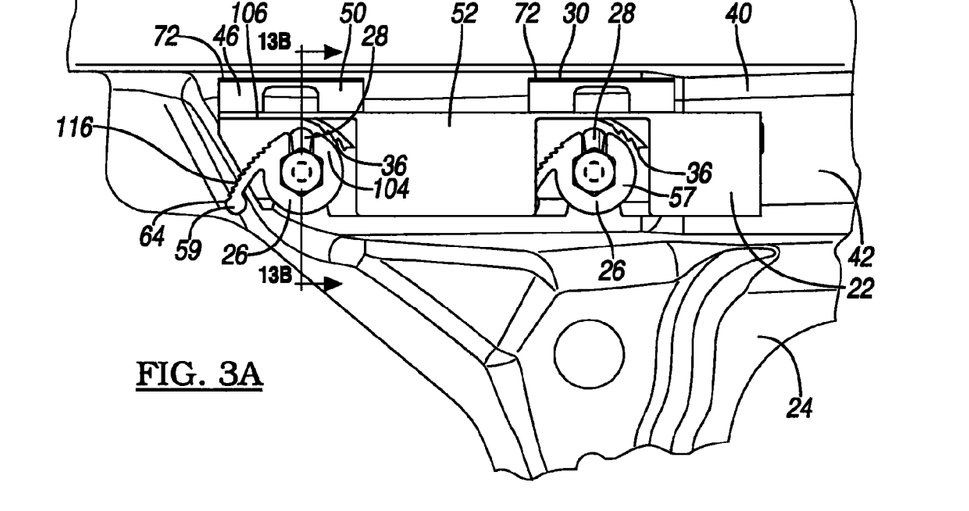

As shown in FIG. 3A, the trim component 22 is slid so as to engage a trim piece bearing surface 72 with the sheet metal. In this position, the T-shaped stud 56 is incorporated into the cylindrical inner aperture 60.

Figure 3B:
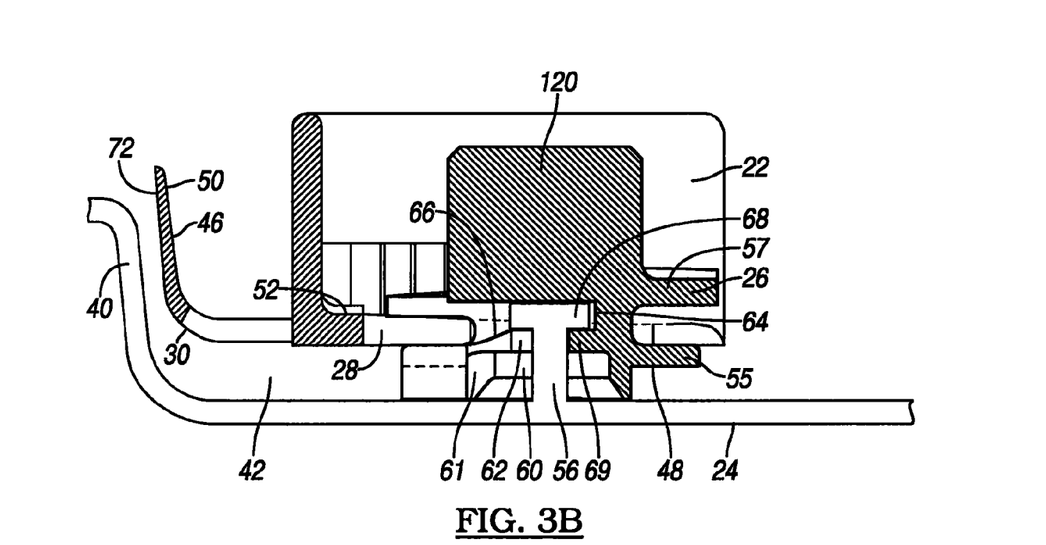

As shown in FIG. 3B, the head 68 of the T-shaped stud 56 is positioned within the second portion 64 of the inner aperture 60. The head 68 of the T-shaped stud 56 passes over the ramped surface 58 so as to position the lower surface 69 of the head portion 68 onto the flange 57 bearing surface.

Figure 4A:
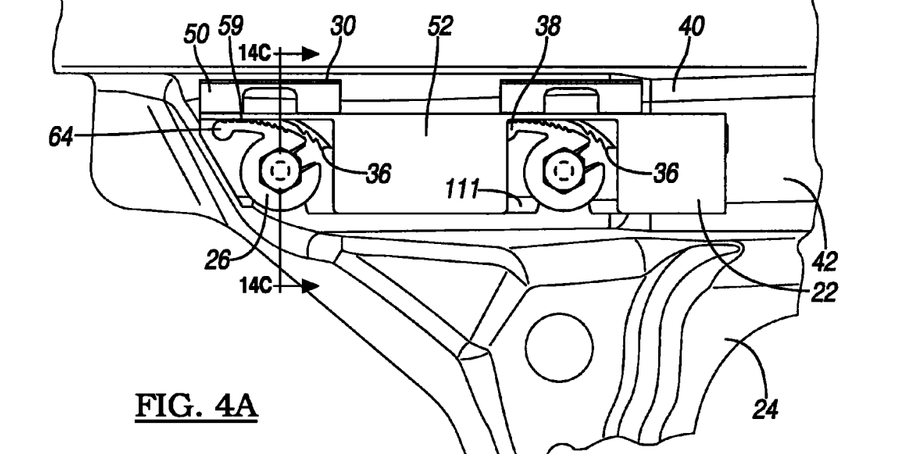
Figure 4B:
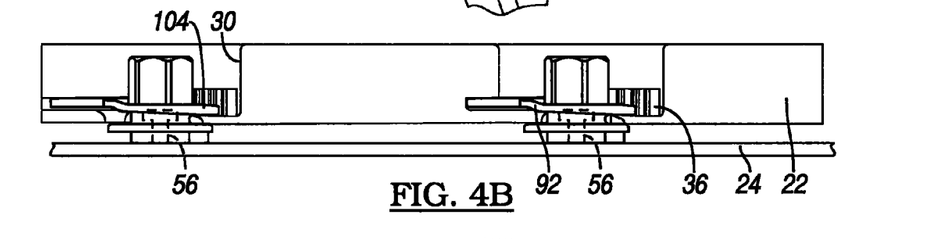

As shown in FIGS. 4A and 4B, the rotatable fastener 26 is rotated, thus capturing the head 68 of the T-shaped stud 56 within the aperture 60. Rotation of the rotatable fastener 26 positions the ramped surface 58 against a bearing surface 94 on the trim component 22.

Figure 4C:
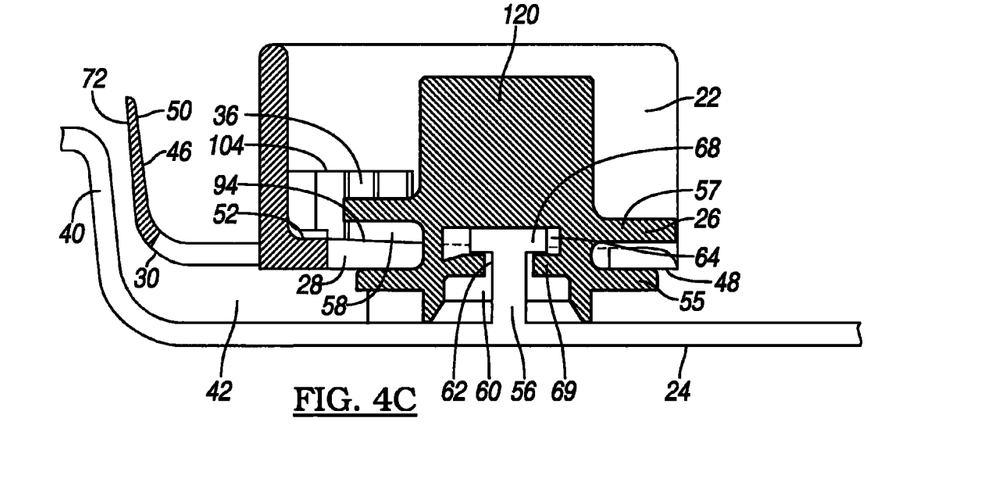
Figures 5A, 5B:
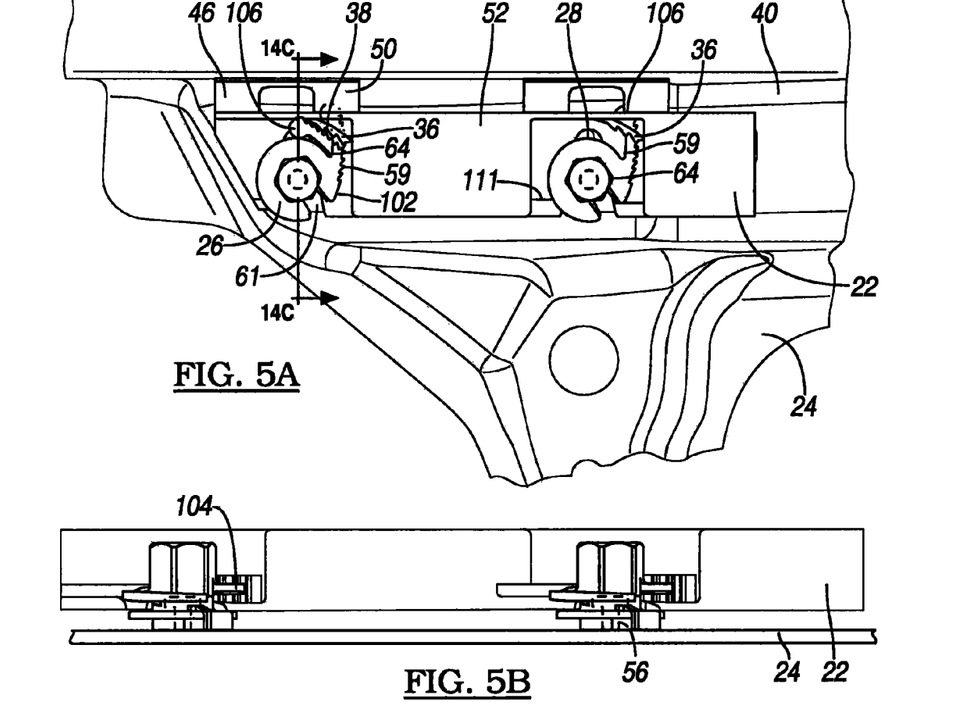
Figure 5C:
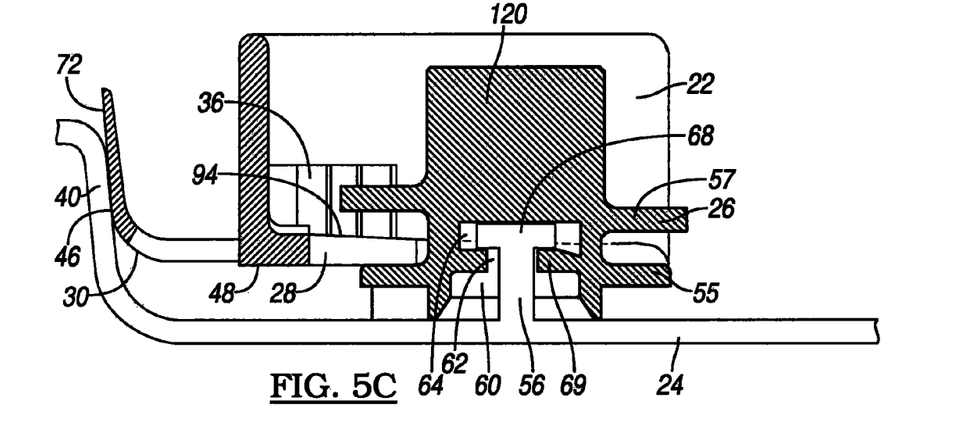

As best seen in FIG. 4C, the rotation of the rotatable fastener 26 captures the T-shaped stud 56 and presses a second trim piece bearing surface 94 against a second sheet metal bearing surface. By continuing to rotate the rotatable fastener 26, the camming arm 64 is rotated and engaged with the locking finger 36 of the trim component 22. As best shown in FIG. 5B, locking teeth 102 and the camming arm 64 engage locking teeth 104 on the deformable finger 36. Optionally, a generally circular end of the camming arm 64 can apply forces against an internal bearing surface 106 of the trim component 22 to force the trim component 22 against the sheet metal structure 24. As shown in FIG. 56, the trim component 22 is pushed into both the first and second sheet metal bearing surfaces.

Figure 6:
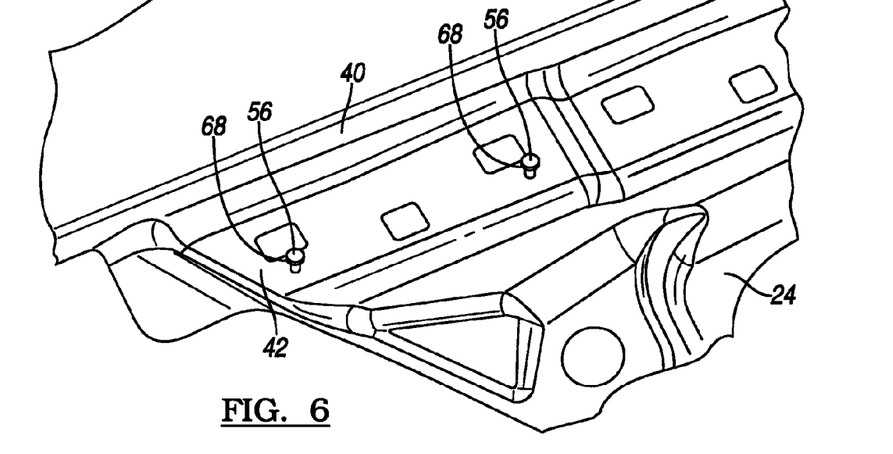
FIG. 6 represents a sheet metal structure showing the FIGS. 1-5.

FIG. 6 represents the sheet metal structure 24. Shown is the pair of generally perpendicular sheet metal bearing surfaces 40 and 42. Also shown is a pair of T-shaped weld fasteners 56 which extend generally perpendicular to one of the surfaces. As shown, the head of the T-shaped fastener is spaced away from the coupling surface.

Figure 7:
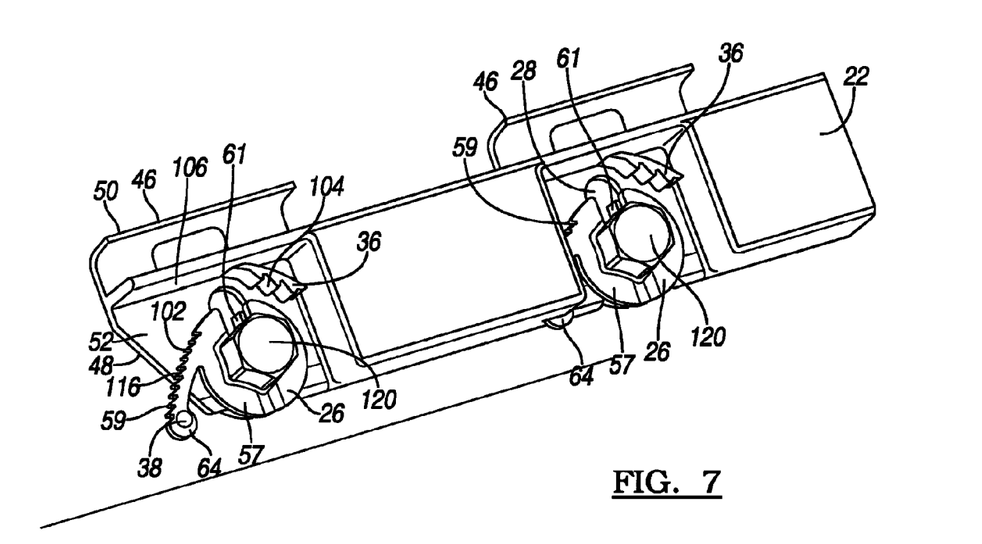
FIG. 7 represents a trim component showing FIGS. 1-5.
Figure 8A:
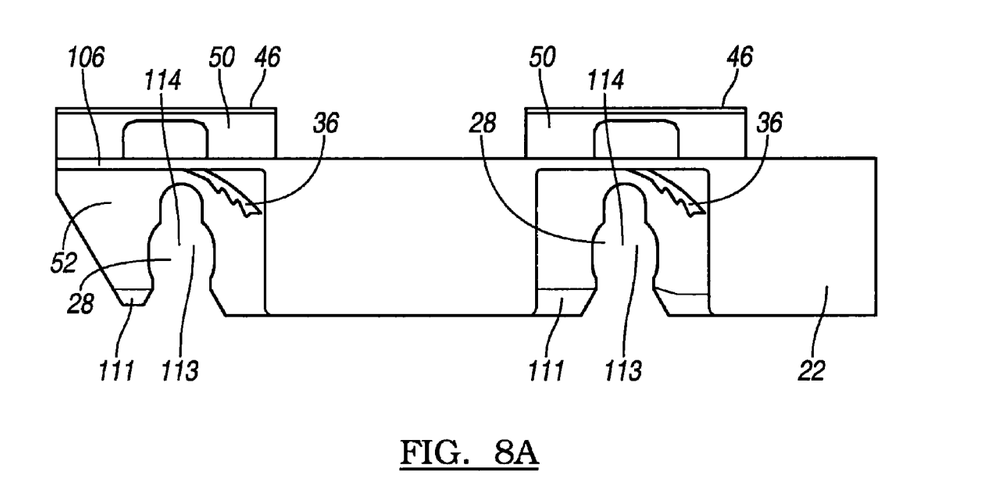
FIGS. 8A and 8B represent the trim component showing FIG. 7 with a retainable fastener according to the present teachings.
Figure 8B:
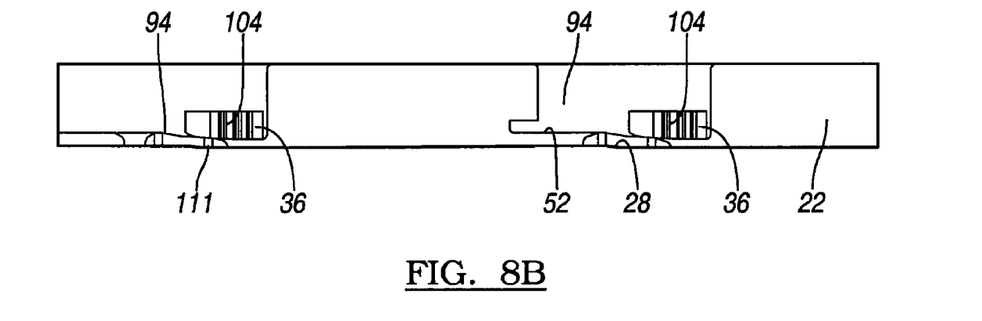

FIG. 7 and FIGS. 8A and 8B represent a perspective view of the trim component 22. Shown is the first and second bearing surfaces configured to bear against the first and second sheet metal bearing surfaces. Shown defined within the trim component 22 is the keyway 28 which rotatably supports the rotatable fastener 26. The rotatable fastener 26 has a generally cylindrical body defining the cylindrical aperture 60. The cylindrical body defines the side slot 61 which accepts the T-shaped stud 56.

Shown in FIGS. 8A and 8B is the ramped lead-in portion 111 for the keyway 28. The keyway 28 additionally has a generally elliptical rotatable fastener holding portion 113 and the aperture 114. Also shown is the relationship of the locking finger 36 and the interior cam engaging surface. Shown in FIG. 8B is the second ramped surface 65 which engages the bearing surface 63 of the first coupling flange 54 of the rotatable fastener 26.

Figure 9:
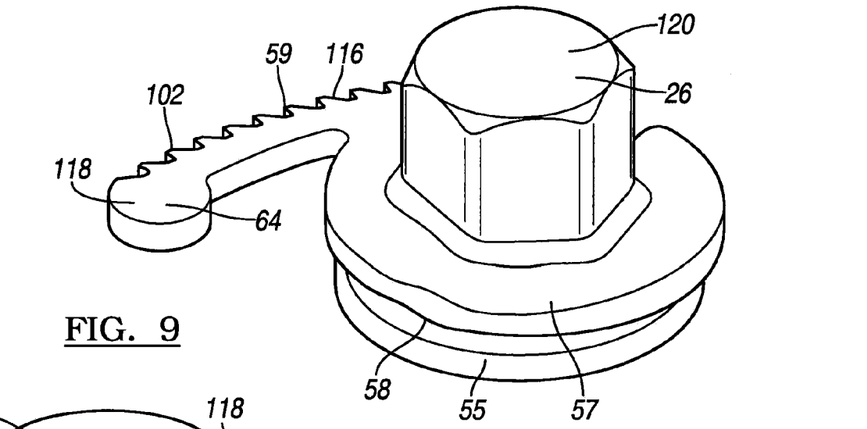
FIG. 9 represents a first perspective view of the rotatable fasteners shown in FIGS. 1-5.
Figure 10A:
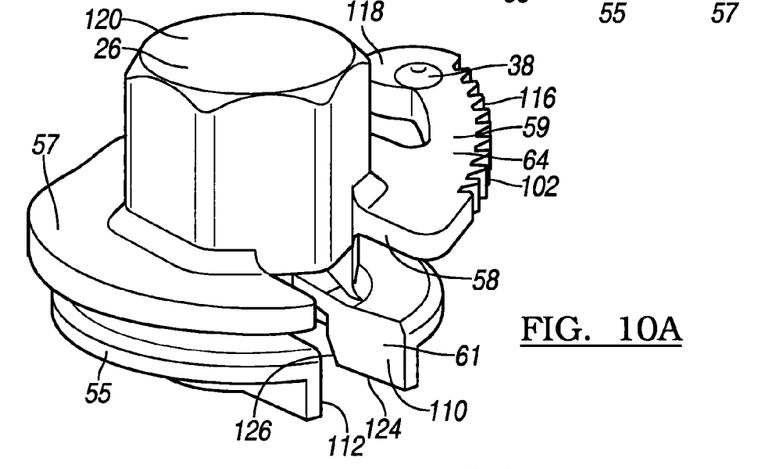
FIGS. 10A and 10B represent a second perspective view of the rotatable fasteners shown in FIGS. 1-5.
Figure 10B:
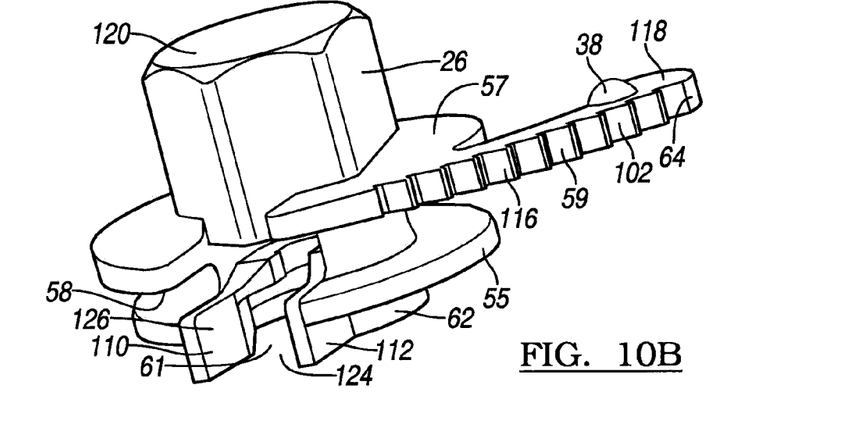
Figure 11:
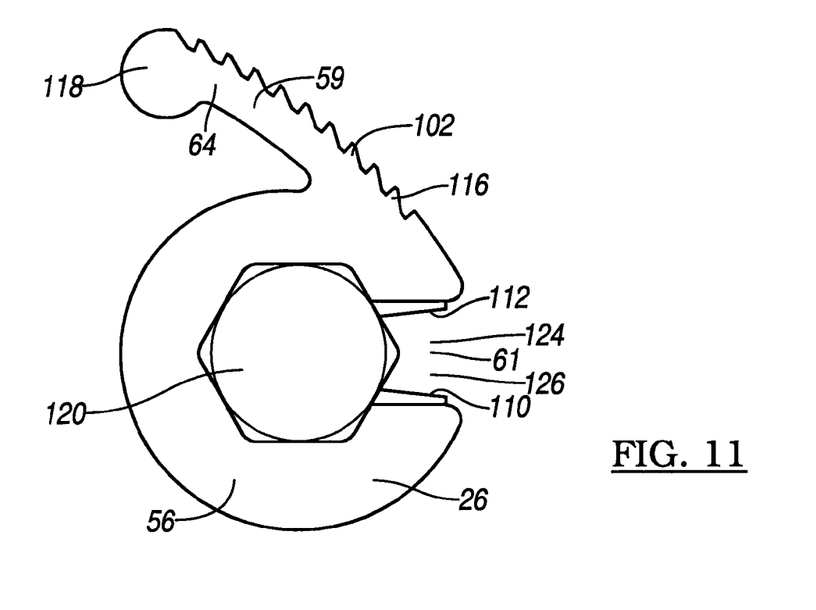
FIG. 11 represents a top view of the rotatable fastener shown in FIG. 10.

FIGS. 9-16 represent various perspective views of the rotatable fastener 26 according to the present teachings. Shown in FIG. 9 is the generally cylindrical body 120 having the assembled coupling features. The top portion can have a plurality of planar flanged surfaces 122 or a hex-shaped aperture 123 which can be used to engage a tool. The first flange 55 defines a slot 124 and lead-in portion 126. The lead-in portion 126 can have a pair of opposed ramped surfaces 110 and 112. These surfaces can guide the body of the T-shaped stud 56 in instances when the rotatable fastener 26 is not properly aligned with the T-shaped stud 56. Optionally, the second flange can have a slot defined therein.

Figure 12:
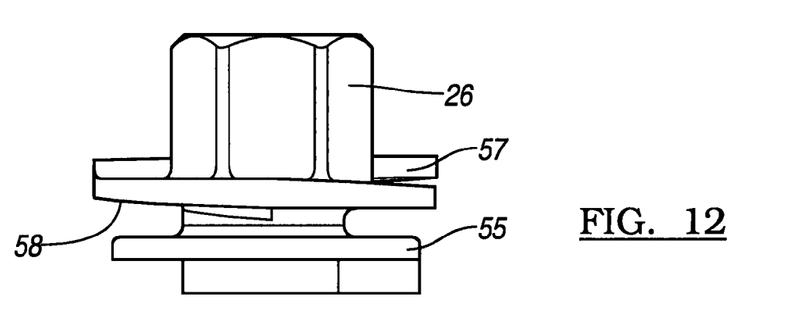
FIGS. 12 and 13 represent side views of the rotatable fastener according to the present teachings.
Figure 13:
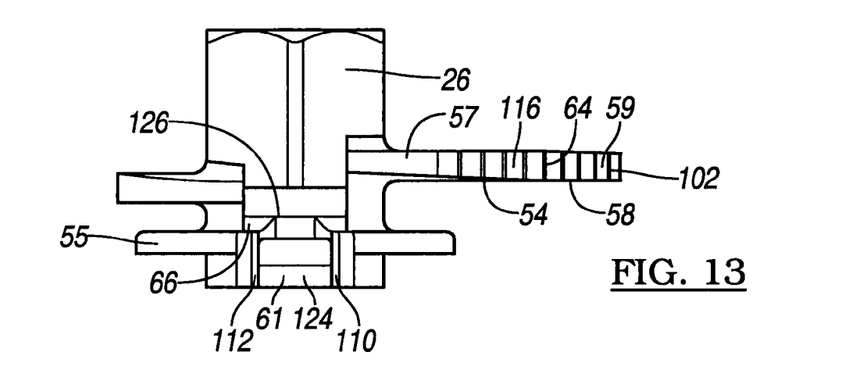

As best seen in FIGS. 9-13, the second coupling flange 57 has the depending camming arm 64. The camming arm 64 has a toothed exterior surface 116 and a circular camming surface 118 which is configured to engage locking teeth on the trim. As shown in FIGS. 12 and 13, the upper flange can have a generally helical or ramped configuration. This configuration defines the ramped surface of the second coupling flange.

Figure 14:
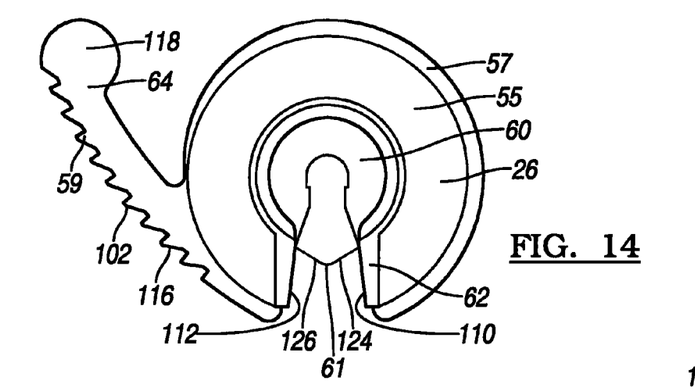
FIG. 14 represents a bottom view of the rotatable fastener shown in FIGS. 12 and 13.

As shown in FIGS. 12 and 13, the first and second coupling flanges 55 and 57 form a pair of generally parallel planes. The second coupling flange 57 has a generally helical bearing surface 52 which applied force onto the trim component 22 when rotated. As best seen in FIG. 14, the distance between the first and second coupling flanges 55 and 57 varies radially from a minimum at the first surface 112 to a maximum at the second surface 110.

Figure 15:
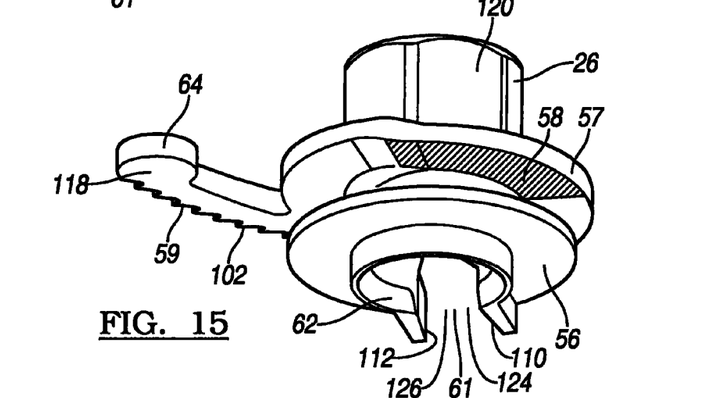
FIG. 15 represents a perspective view of the rotatable fastener shown in FIG. 14.
Figure 16:
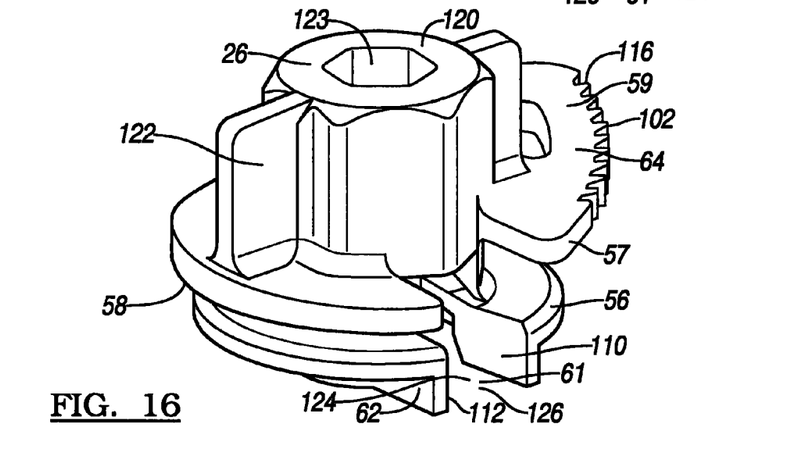
FIG. 16 represents a perspective view of an alternate nut according to the present teachings.
Figure 17A:
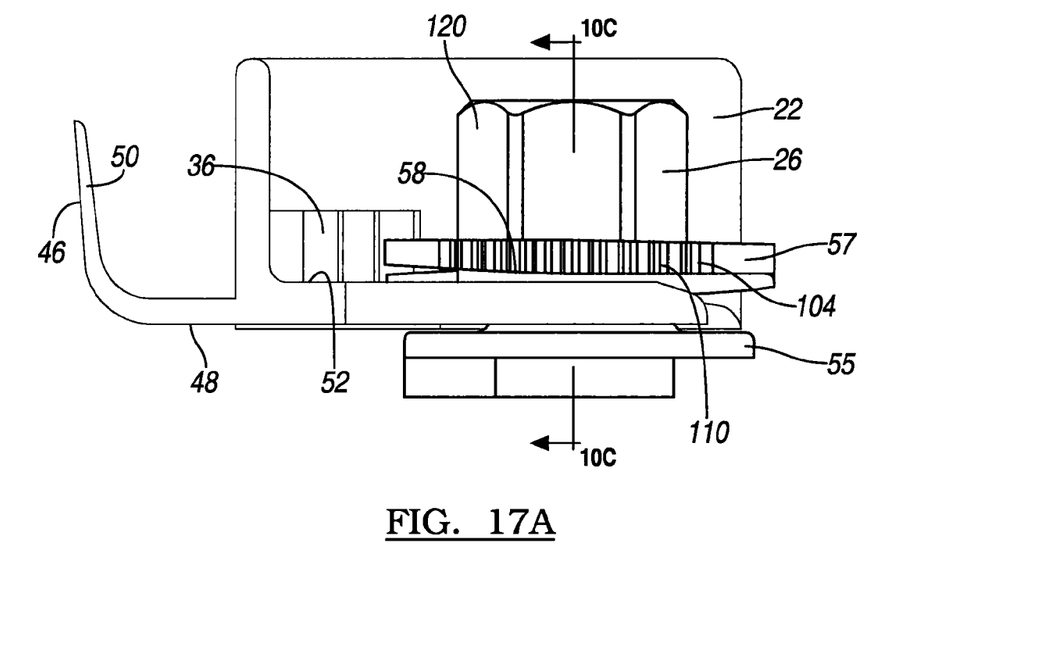
FIGS. 17A-17D represent side views of the nut engaged with the trim component.
Figure 17B:
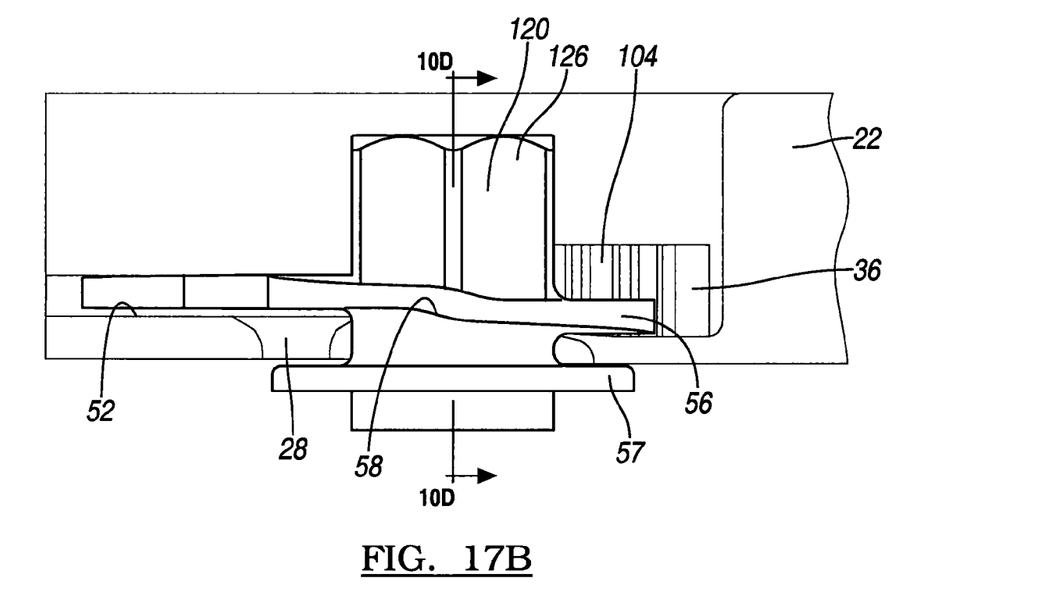
Figure 17C:
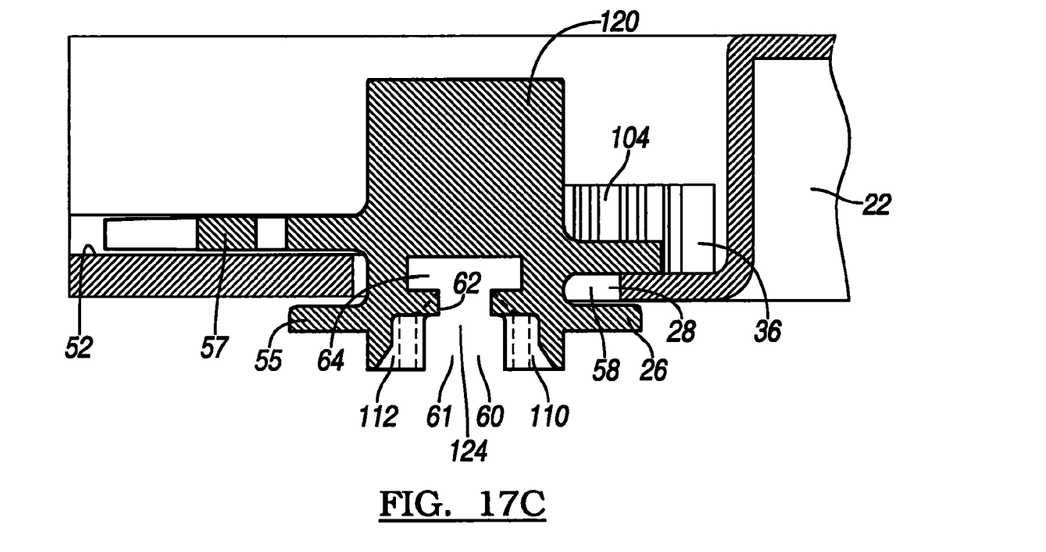
Figure 17D:
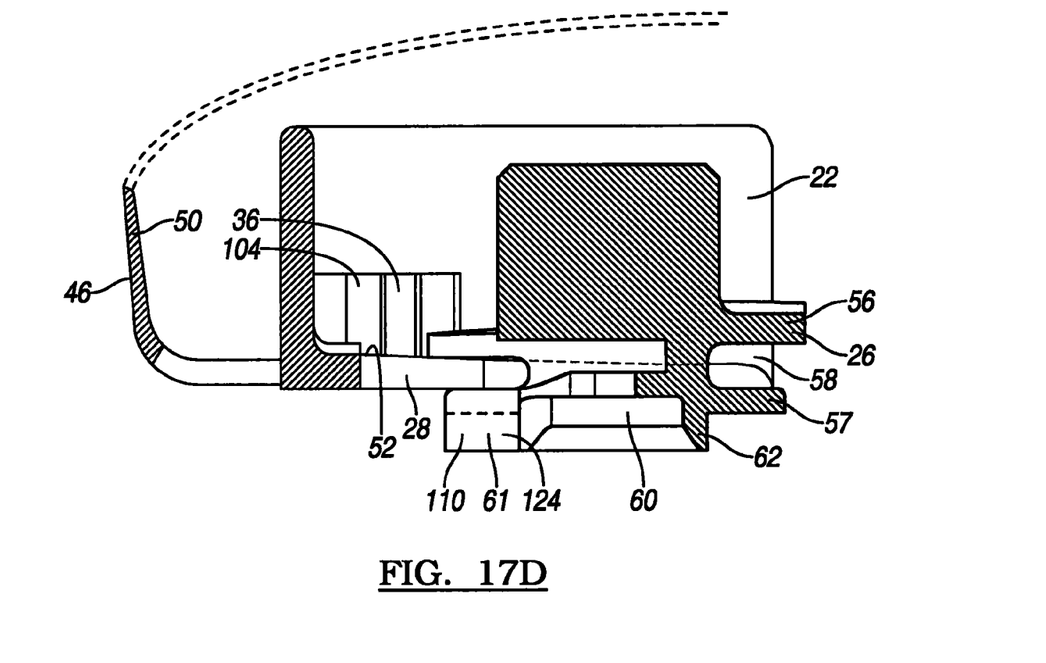

FIGS. 14 and 15 represent bottom and perspective views of the side slot 61 cylindrical central aperture 60. Shown is a bottom flange 62 which bears against the trim component 22. The bottom flange 62 functions to locate the first flange 55 with respect to the bearing surface of the trim component 22.

FIGS. 17A-17D represent the interaction of the bearing surfaces of the rotatable fastener 26 with various bearing surfaces of the trim component. As shown, rotation of the rotatable fastener 26 applies force onto the interior surface of the trim component 22 while the camming arm 64 presses the trim component into the second sheet metal surface. It should be noted that the trim component 22 shown in FIGS. 1-17D can have a Class A surface which engages the sheet metal structure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. The system to couple a trim piece to a sheet metal component comprising:
    a stud having a head, the stud connected to the sheet metal component;
    a trim piece having first and second bearing surfaces configured to bear against a first and second sheet metal bearing surfaces, said trim piece defining an aperture; and
    a rotatable fastener annularly supported within the aperture, the rotatable fastener having a generally cylindrical body defining a cylindrical interior cavity therein and a side slot communicating with said interior cavity, the cylindrical interior cavity having a first portion having a first diameter and a second portion having a second diameter larger than the diameter of said head, said rotatable fastener rotatable from a first position to a second position, wherein in the first position the side slot is aligned with the trim piece aperture to allow insertion of the head into the second portion, wherein in the second position the stud is captured in the interior cavity of the rotatable fastener.

2. The system according to claim 1, wherein the rotatable fastener comprises a nut having a camming flange configured to bear against a trim piece bearing surface and force the trim piece bearing surface toward the second sheet metal bearing surface.

3. The system according to claim 1, wherein the trim piece defines a ramped surface adjacent to the aperture, and said rotatable fastener comprises a nut having a bearing surface configured to bear against the ramped surface, wherein the nut is rotated from said first position to said second position to apply a force onto the trim piece to force the first trim piece bearing surface toward the first sheet metal bearing surface.

4. The system according to claim 3, wherein the nut defines a nut sloped surface configured to interface with a trim piece sloped surface when the nut is rotated from the first position to a second position.

5. The system according to claim 1, wherein the trim piece aperture has a keyway slot having a tapered entrance portion.

6. The system according to claim 1, wherein the rotatable fastener has a first flange configured to surround a portion of the cylindrical body and a second generally helical flange which surrounds a portion of the cylindrical body.

7. The system according to claim 6, wherein the first flange is disposed about a first side of the trim piece and the second flange is disposed about a second opposed side of the trim piece.

8. The system according to claim 7, wherein the first and second flanges define slots to align with the side slot in the cylindrical body.

9. A system for coupling a trim piece component to a body component having two bearing surfaces, the system comprising:
- a T-shaped fastener coupled to the body component;
- the trim piece component having first and second exterior bearing surfaces and an interior bearing surface, said trim piece component defining a keyway having a lead-in portion;
- a rotatable fastener having a cylindrical body rotatably positioned within the keyway, said cylindrical body defining a fastener holding aperture and a side slot, said rotatable fastener having an exterior carrying flange configured to bear against the interior bearing surface of the trim piece component upon the rotation of the rotatable fastener to apply force on the trim piece component, wherein the rotatable fastener is rotatable from a first position to a second position, wherein the side slot is aligned with the keyway when the rotatable fastener is in the first position to allow the insertion of the T-shaped fastener into the fastener holding aperture and wherein the side slot is generally perpendicular to the keyway in the second position to capture the T-shaped fastener in the fastener holding aperture.

10. The system according to claim 9, wherein the cylindrical body of the rotatable fastener comprises a first annular bearing flange and a second bearing flange, said second bearing flange defining a ramped surface, said first and second flanges bearing on opposed sides of the trim piece component.

11. The system according to claim 10, wherein the ramped surface of the rotatable fastener is configured to interface with a ramped surface on the trim piece component.

12. The system according to claim 9, wherein the rotatable fastener comprises a camming surface configured to bear against the interior bearing surface of the trim piece component.

13. The system according to claim 12, wherein the camming surface comprises teeth.

14. The system according to claim 13, wherein the interior bearing surface comprises a locking flange having a plurality of locking teeth.

15. The system according to claim 14, wherein the rotatable fastener defines a locking flange on the camming surface.

16. The system according to claim 15, wherein the locking flange includes a protrusion generally perpendicular to the camming surface, said protrusion configured to engage a locking surface on the trim piece component.

* * * * *